(12) United States Patent
Steinich

(10) Patent No.: US 8,353,218 B2
(45) Date of Patent: Jan. 15, 2013

(54) SCANNING UNIT

(75) Inventor: Klaus Manfred Steinich, Zorneding/Poring (DE)

(73) Assignee: ASM Automation Sensorik Messtechnik GmbH, Moosinning (DE)

( * ) Notice: Subject to any disclaimer, the term of this patent is extended or adjusted under 35 U.S.C. 154(b) by 401 days.

(21) Appl. No.: 12/653,556

(22) Filed: Dec. 16, 2009

(65) Prior Publication Data
US 2010/0156398 A1  Jun. 24, 2010

(30) Foreign Application Priority Data
Dec. 22, 2008  (DE) .................... 20 2008 016 972 U

(51) Int. Cl.
*G01B 7/16*  (2006.01)
(52) U.S. Cl. ........................................ 73/779
(58) Field of Classification Search .............. 73/779
See application file for complete search history.

(56) References Cited

U.S. PATENT DOCUMENTS

| | | | | |
|---|---|---|---|---|
| 4,454,763 A | * | 6/1984 | Mahler | 73/639 |
| 4,882,848 A | * | 11/1989 | Breyer et al. | 33/559 |
| 5,690,110 A | * | 11/1997 | Tanaka | 600/446 |
| 7,076,996 B2 | * | 7/2006 | Markakis et al. | 73/105 |
| 7,255,678 B2 | * | 8/2007 | Mehi et al. | 600/446 |
| 7,323,960 B2 | * | 1/2008 | Maruyama | 335/215 |
| 7,619,405 B2 | * | 11/2009 | Steinich et al. | 324/207.13 |

FOREIGN PATENT DOCUMENTS

| | | |
|---|---|---|
| DE | 8307568 | 11/1983 |
| DE | 3723933 | 2/1989 |
| DE | 4334811 | 4/1995 |
| DE | 19736454 | 2/1999 |
| DE | 102006041827 | 5/2007 |
| DE | 102006020621 | 8/2007 |

* cited by examiner

*Primary Examiner* — Lisa Caputo
*Assistant Examiner* — Octavia Davis-Hollington
(74) *Attorney, Agent, or Firm* — Head, Johnson & Kachigian, P.C.

(57) ABSTRACT

A magneto-strictive scanning unit is formed through an actuation pushrod disposed and guided on an outside of a tight housing of a position sensor, in which the delicate sensor is tightly encapsulated, and components of an actuation unit can be disassembled and repaired without opening the sensor housing.

19 Claims, 6 Drawing Sheets

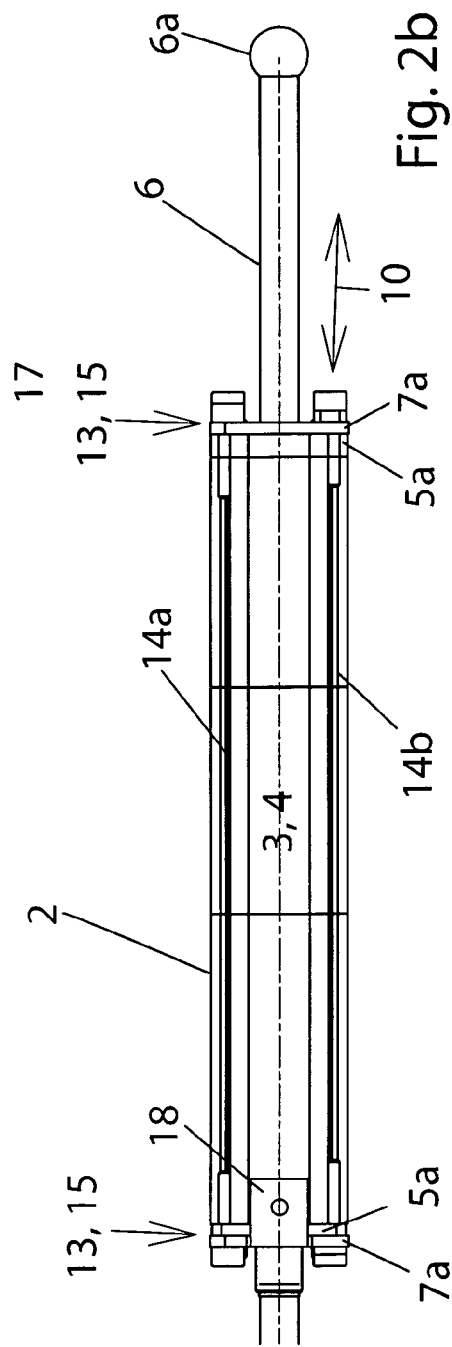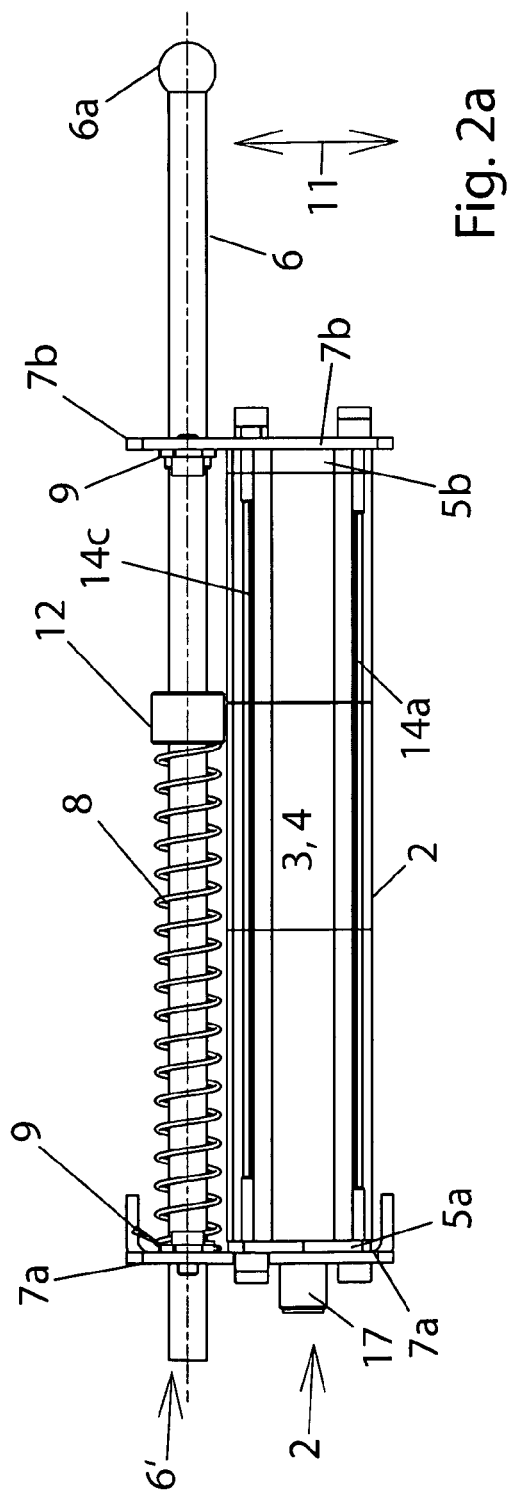

SCANNING UNIT

CROSS-REFERENCE TO RELATED APPLICATIONS

This application claims priority to German Patent Application No. 20 2008 016972.0 filed 22 Dec. 2008.

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC

Not Applicable

BACKGROUND OF THE INVENTION

1. Field of the Invention

The invention relates to a scanning unit.

2. Description of the Related Art

Scanning units are being used to either determine the presence of an object at a particular position or in a particular area, or to determine the distance between two objects which can be variable.

Scanning units are often operated through optical or electronic methods, wherein each method has its specific pros and cons.

In particular when a scanning unit has to be operated under harsh environmental conditions, thus in a highly contaminated environment or in an environment loaded with abrasive solid particles under high pressure, great heat or high humidity, optical and purely electronic scanning units reach their limits, in particular since their tight long term encapsulation poses considerable problems.

BRIEF SUMMARY OF THE INVENTION

Thus, it is the object of this invention to provide a scanning unit which is very wear resistant under harsh environmental conditions in spite of simple and cost effective manufacture and which is simple to maintain and repair and which can scan in both directions of the longitudinal axis.

By using a magnetostrictive measuring unit, thus a magnetostrictive position sensor for the scanning unit, the position sensor can be tightly encapsulated. Also for a magnetostrictive sensor, the encoder which is an encoder magnet then, can be also disposed touch free with respect to the sensor and be completely outside of the housing of the sensor.

In the present case the encoder magnet, at which the actuation pushrod of the contact scanning unit, which actuation pushrod is guided parallel to the longitudinal extension of the sensor outside of the housing of the sensor longitudinally moveable in the contact scanning unit, is longitudinally fixated at the sensor in the longitudinal portion of the housing of the sensor.

The scanning unit either comprises only a single actuation pushrod which respectively protrudes with both ends beyond both ends of the housing and has a scanning head at each end, or it comprises two separate actuation pushrods which protrude with their outer ends supporting the scanning heads beyond the housing of the sensor and which are mounted at each other fixated in longitudinal direction with their other rear ends, so that no relative movement of the two actuation pushrods relative to one another is possible in longitudinal direction.

The actuation pushrod (pushrods) can be preloaded through a spring, which preferably winds as a helix-shaped spring about the actuation pushrod and which is preferably a compression spring, either into an extended position relative to the housing or also into a retracted position relative to the housing.

Through providing two counteracting springs, the one or both coupled actuation pushrods can also be preloaded into a defined intermediary position.

By loading one of the two scanning heads in longitudinal direction towards the housing, the one or both coupled actuation pushrods are moved relative to the housing of the sensor and, thus, also the encoder magnet, which is longitudinally fixed at one of the actuation pushrods. Also, when two coupled actuation pushrods are provided, preferably overall only one encoder magnet is provided overall in order to achieve an unambiguous signal. The springs are supported on one side at one of the face plates, on the other side they are supported at a respective shoulder of the actuation pushrod which can e.g. be a slid on and longitudinally fixed support bushing For two actuation pushrods which are adjacent to one another in longitudinal direction and connected to one another so they are longitudinally fixed, their rear ends can either be connected to one another directly, or their rear ends are respectively connected to one another at the same support slide which is supported in a form-locked manner in longitudinal direction at the housing in that it runs e.g. in an outer groove of the housing.

Also, a single pass-through actuation pushrod can be fixed at such a slide in the center portion between the two face plates in order to provide an additional guide at this location. In particular, however, the encoder magnet can be disposed in such a slide.

The actuation pushrod in retracted state as a starting position protrudes with its one free end, where the scanning head is disposed, not at all or only slightly beyond the longitudinal extension of the housing of the position sensor and can be extended from this position along the scanning distance, wherein it is preferably preloaded into the extended position through a spring, which extends as a helical coil spring about the actuation pushrod and which is e.g. supported at an encoder magnet at the encoder magnet on the one side.

Preferably, the actuation pushrod is supported in bore holes of the face plates which extend from the respective longitudinal end of the position sensor in transversal direction and which extend beyond the housing of the position sensor in order to provide a support for the actuation pushrod.

The housing of the position sensor is preferably comprised of a circumferentially closed profile in which the position sensor is disposed in its entirety and which is closed tight by covers on the face side.

In one of the cover plates, a plug connector for running the measurement signals out of the sensor can be disposed. However, also running the measurement signals out via radio is possible, which facilitates a completely tight configuration of the housing of the sensor.

Thus, only the actuation pushrod is disposed outside of the sensor housing. However, since the actuation pushrod can be made from massive metal, for example, and also the encoder magnet mounted thereon and the spring preloading the pushrod is not very sensitive, the entire scanning unit is not even influenced by harsh environmental conditions.

The guide bushings are preferably configured as slide bushings and are preferably made from plastic material or brass.

The guides of the actuation pushrods in the face plates are preferably configured as sliding guides, and are, on the one hand, not very susceptible to wear and can, on the other hand, can be easily replaced, like all components of the actuation pushrods, without opening the housing of the position sensor.

For this purpose, also the face plates which protrude in transversal direction and in which the actuation pushrod is supported, are not identical with the cover plates, which complete the hollow profile to form a housing for the position sensor and also seal it.

The cover plates of the hollow profile are fixed in threaded openings of the profile provided for this purpose by threading in cover bolts through respective openings in the cover plates, which openings are preferably comprised of threaded grooves open to the outside, which threaded grooves are part of the profile and extend over the entire length of the profile and the bolts are threaded into them so they tap their own threads.

For an approximately rectangular cross section of the hollow profile, the outward open threaded grooves are preferably disposed in the outer corners.

In order to mount the actuation pushrod, e.g. only two each of the four respective threaded connection at each corner of each end are being used in order to fix the cover plate at the hollow profile only passing through the cover plate.

For this purpose, respective recesses or pass-through openings are disposed in the respective face plate at the two respective locations, in which face plate, the bolt head of the cover bolt are disposed.

Subsequently, the face plates are placed onto the end covers, which are already place tight onto the hollow profile and bolted down, and they are bolted to the profile through two additional cover plates, which now extend through the face plate as well as through the cover plate into the profile and which press the face plate against the cover plate and affix it.

Already before assembling the two face plates, the respective support bushing for the actuation pushrod is mounted therein, and the actuation pushrod is inserted with the spring preloading it.

This way, in case the actuation pushrod or the encoder magnet or the spring or the guide bushings are damaged, the entire actuation unit can be disengaged from the position sensor, which remains tightly encapsulated, through disengaging the face plates, so that the entire actuation unit can be repaired or maintained and reattached to the position sensor without having to open the housing of the position sensor.

The actuation pushrod thus does not have to be secured against rotation, when the encoder magnet is configured e.g. as a ring magnet, which also facilitates using particularly cost effective guide bushings with a circular cross section.

In order to affix the actuation pushrod in its retracted position for assembling the scanning unit, a fixation device can be provided between the pushrod and one of the face plates.

BRIEF DESCRIPTION OF THE DRAWINGS

Embodiments of the invention are subsequently described in more detail with reference to drawing figures, wherein:

FIGS. 2a, b show the same scanning unit in a top view and in a side view;

DETAILED DESCRIPTION OF THE INVENTION

Figure 1:
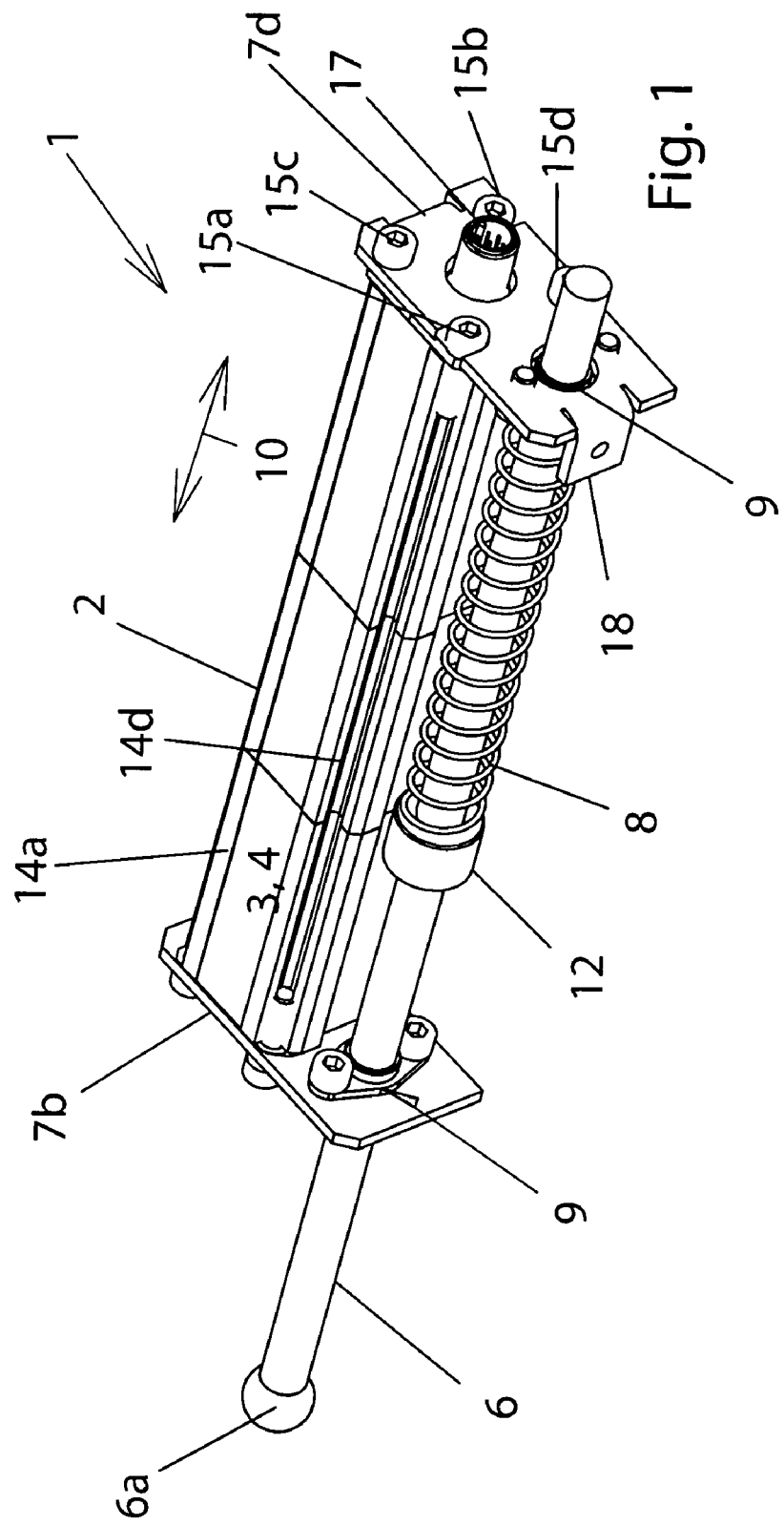
FIG. 1 shows a scanning unit with an actuation pushrod in a perspective view.

The scanning unit 1 is fixed at a first object (not shown), e.g. fixed through the fixation ear 18 at one of the face plates 7b, and thus, so that when extending the scanning head 6a of the actuation pushrod 6, it contacts the second object (not shown either), and which is to be detected with respect to its position or with respect to its mere presence.

The scanning unit 1 then detects the position of the actuation pushrod 6 of the actuation unit 6' relative to the position sensor 2, wherein the encoder magnet 12 which is fixed at the actuation pushrod 6 in longitudinal direction 10 generates a magneto-mechanical interference at the respective longitudinal position of the position sensor 2 through its tight housing 3 by means of a magnetic field, which magneto-mechanical interference is detected by the processing electronics of the magneto-strictive position sensor included in the housing 3, and which is put out as electrical signals through the plug socket 17, which is disposed in the one face side of the housing 3.

The housing 3 of the position sensor 2 is thus made of a circumferentially closed hollow profile 4, which is tightly closed at the open face sides through bolted on cover plates 5a, b and gaskets placed there between.

For this purpose, the cover plates 5a, b are bolted down on each side by means of two cover bolts 15a, b, which are threaded into the threaded grooves 14a, b at two diagonally opposed corners through respective openings in the cover plates 5a, b.

The threaded grooves 14a, b, ... are configured as outward open grooves in the corner portions of the profile as components of the profile cross section, thus extending over the entire length of the profile, which grooves comprise a groove shape and a groove size which facilitates to thread the cover bolts 15a, b into the threaded grooves 14a, b in a self-tapping manner.

Nevertheless, the threaded grooves 14a, b can be used in the center portion, thus remote from the thread 13, for other purposes, e.g. for affixing the housing 3 and thus the entire scanning unit 1 at a component of the ambient, e.g. by means of clamping claws.

In longitudinal direction from the outside, a respective face plate 7a, b is placed onto the cover plate from the outside, which face plate extends in transversal direction 11 in one direction beyond the dimensions of the profile 4 and thus beyond the dimensions of the cover plates 5a, b, wherein the longitudinal guides configured with guide sleeves 9 for the actuation pushrod 6 are disposed in the portion of the face plate extending beyond the profile 4 and of the cover plates 5a, b.

The face plates 7a, b are fixed at the cover plates 5a, b and thus the hollow profile 4 by means of cover bolts 14c, d which are disposed in both other corners of the profile 4, and which now extend through the end cover 7*a* or *b* and through the cover plate 5*a, b* into both other threaded grooves 15*c, d*.

The actuation pushrod 6 extends through the two guide bushings 9 and protrudes outward from both guide bushings 9 in all its movement conditions.

In the retracted position, in which the scanning head 6*a* disposed at one end of the actuation pushrod 6 is most proximal to its adjacent face plate 7*b*, the rear end of the actuation pushrod 6 protrudes the furthest from the other face plate 7*a*, and in the most extended position in which the encoder magnet 17 is disposed most proximal to its forward face plate 7*b*, the rear free end of the actuation pushrod 6 only marginally extends beyond the rear face plate 7*a*.

Between the rear face plate 7*a* and the encoder magnet 12 mounted as a ring magnet on the outer circumference of the actuation push rod which simultaneously acts as a support bushing 21, a spiral spring 8 is disposed which preloads the encoder magnet 12 disposed in the longitudinal extension of the housing 2, and thus preloads the actuation pushrod 6 into the extended direction, which actuation pushrod is connected to the encoder magnet 12 in longitudinal direction 10.

Figure 3:
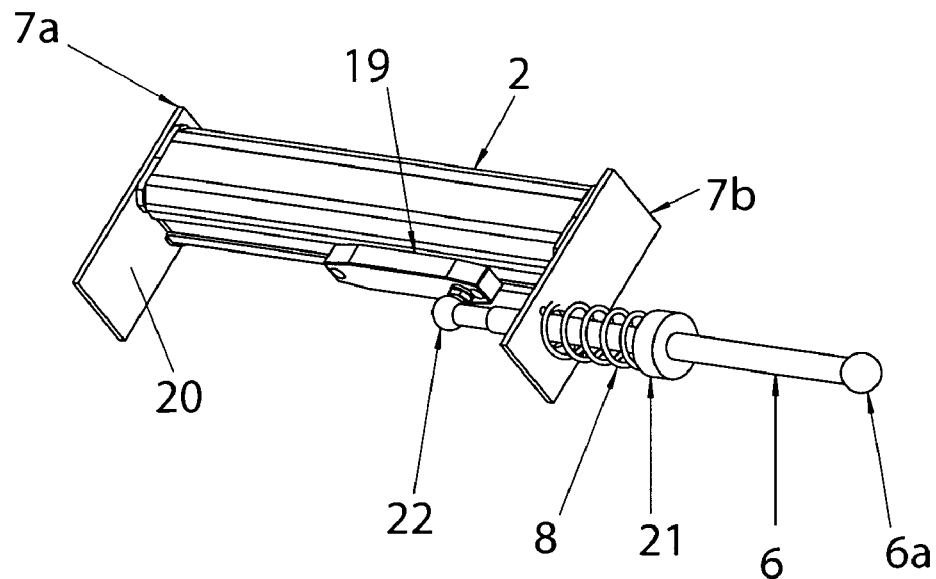
FIG. 3 shows a solution with an actuation pushrod and a support slide.

FIG. 3 shows a solution which also only comprises an actuation pushrod 6, which only comprises a scanning head 6*a* at its end protruding in longitudinal direction beyond the housing 2, wherein the rear end of the scanning head, however, ends in each movement position in the longitudinal portion of the housing 3 and is fixed there in longitudinal direction through a ball joint 22 at a slide 19, which in turn is guided form-locked in longitudinal direction at the housing 2, where it runs form-locked in an outer groove 20 provided on the outer circumference of the housing 2.

Thus, nothing protrudes beyond the other end of the housing 2, which improves the utility of the scanning unit.

The preloading by means of the helical spring 8 is facilitated in this case in that the spring 8 is disposed on the outside of the only face plate 7*b* penetrated by the actuation pushrod 6, and is supported on the opposite side at a support bushing 21, which is also longitudinally fixed outside of the longitudinal extension of the housing 2 on the actuation pushrod 6.

Figure 4:
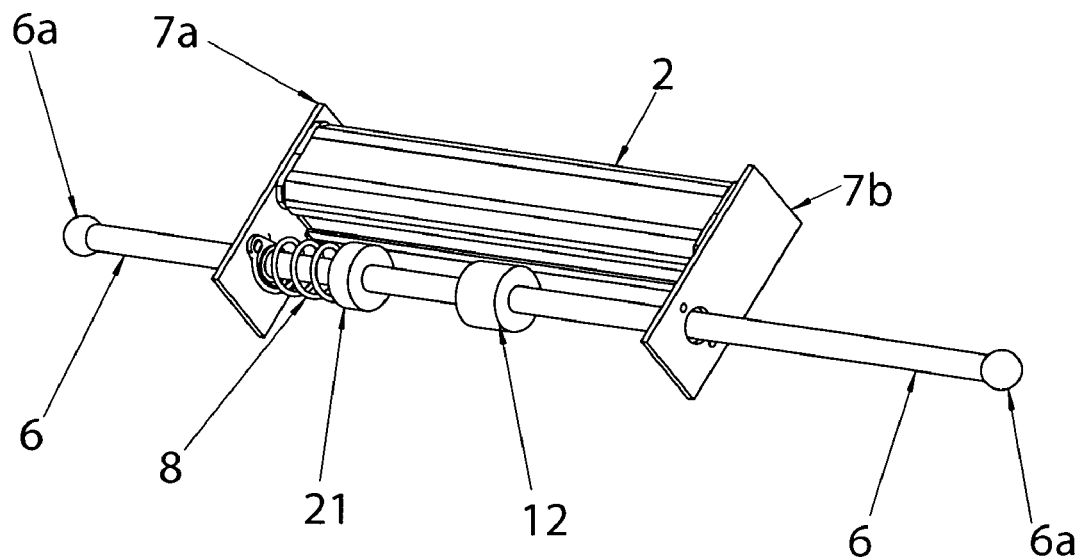
FIG. 4 shows a solution with an actuation pushrod with two scanning heads without support slide.

FIG. 4 shows a solution which differs from the solution in FIGS. 1 and 2, thus with a single actuation pushrod 6 which penetrates both face plates 7*a* and *b*, in two respects.

Figure 5:
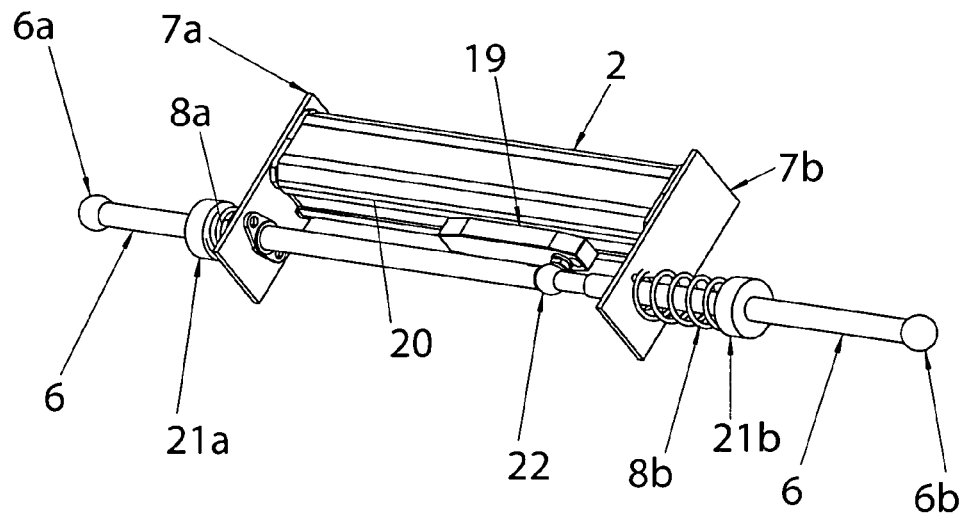
FIG. 5 shows a solution with an actuation pushrod with two scanning heads with support slides.

On the one hand, the actuation pushrod 6 comprises a respective scanning head 6*a* at both ends, which scanning head can be used for scanning, on the other hand, the encoder magnet 12 mounted in the longitudinal extension of the housing 2 is not functionally integrated with the support bushing 21, which is mounted longitudinally fixed on the actuation push rod 6 also in the longitudinal extension of the housing 2 at another location than the encoder magnet 12 and which serves as a support for the spring 8:

FIG. 5 shows a solution similar to FIG. 4, but with the difference that the actuation pushrods 6 passing through both face plates 7*a, b* are additionally pivotably connected in the portion between the face plates 7*a, b* to a slide 19 analogous to FIG. 3, thus through a ball joint 22. Like in FIG. 3, also here, the encoder magnet 12 is disposed in the slide 19, and the slide 19 is supported form-locked in an outer groove 20 of the housing 2.

Furthermore, the actuation pushrod 6 is supported in this solution in a center position through two counteracting springs 8*a, b*, which are respectively supported at one of the face plates 7*a, b* on its outside, and which are supported on the opposite side at one support bushing 21*a, b*, which is disposed on the actuation pushrod 6 respectively outside of the face plates 7*a, b*.

Figure 6:
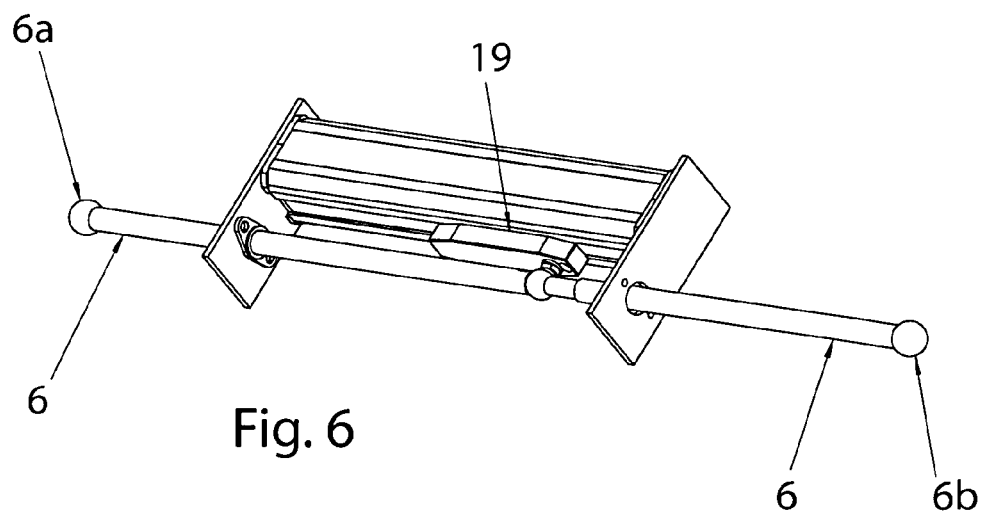
FIG. 6 shows the solution according to FIG. 5 without spring preload.

FIG. 6 shows the same configuration as FIG. 5, but without springs and support bushings, so that in this solution according to FIG. 6, a defined position of the slide 19 and the encoder magnet included therein, which can be sufficient for some applications, can only be accomplished by synchronous simultaneous loading of both scanning heads 6*a, b* in opposite direction towards each other.

Figure 7:
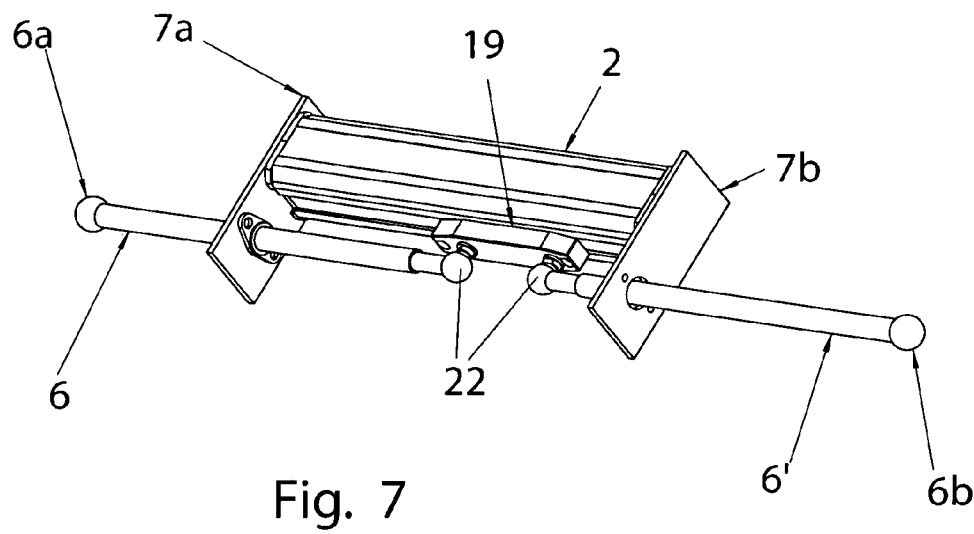
FIG. 7 shows a solution with two actuation pushrods and support slides without springs.
Figure 8:
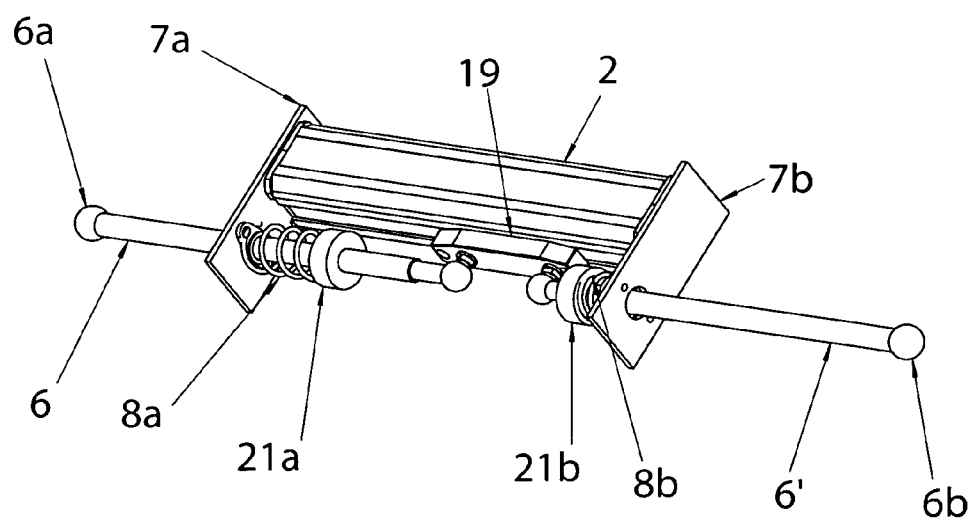
FIG. 8 shows a solution with two actuation pushrods and support slides and internally disposed springs.
Figure 9:
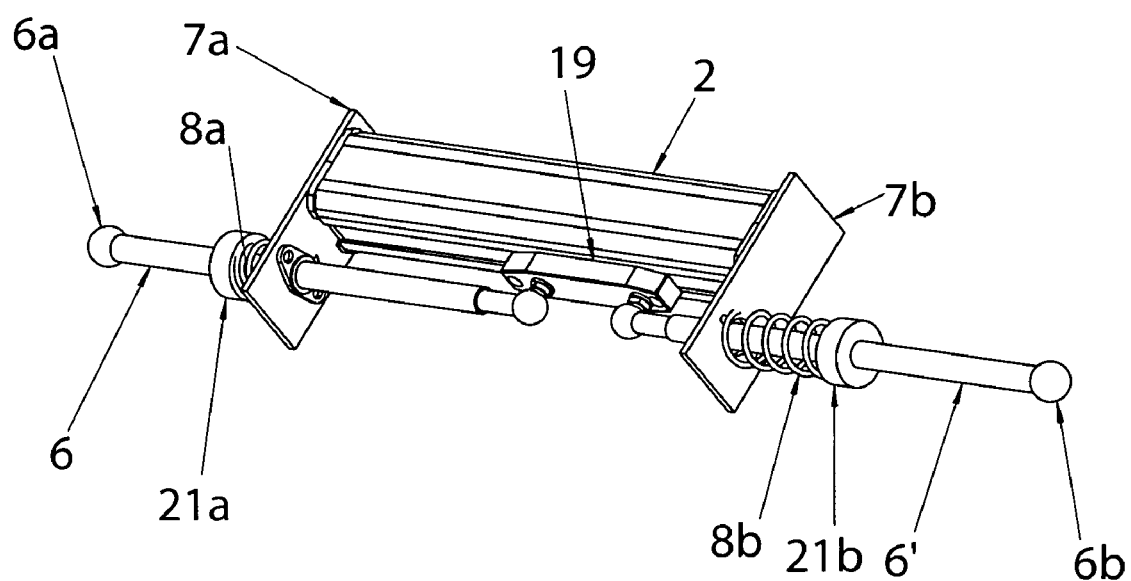
FIG. 9 shows a solution with two actuation pushrods, support slides and springs disposed on the outside.

FIGS. 7 through 9 show solutions, in which two separate actuation pushrods 6, 6' are provided instead of a single actuation pushrod 6, wherein each of the pushrods passes through one of the face plates 7*a, b* and supports a scanning head 6*a, b* at its outer end, while the rear ends of these two actuation pushrods 6, 6' are coupled to one another longitudinally fixed, and thus in turn through a slide 19, which preferably includes the encoder magnet and at which both actuation pushrods 6, 6' are supported through ball joint 22 at their rear ends. As described, this slide 19 is supported form-locked in an outer groove 20 of the housing 2.

The embodiments of the FIGS. 7, 8 and 9 differ in that in the embodiment according to FIG. 9, the slide 19 and thus also the two actuation pushrods 6, 6' are preloaded in a defined center position through two springs 8*a, b* acting in opposite directions to one another, which are disposed on the respective outsides of the face plates 7*a, b* as shown in FIG. 5, and which are embodied here as coil springs coiled around the actuation pushrods and supported at the support bushings 21*a, b* of the actuation pushrods 6, 6'.

This facilitates a travel range of the slide 19 over almost the entire length of the housing 2.

If this is not required, the two springs 8*a, b* according to the embodiment of FIG. 8 can also be respectively disposed at the insides of the support plates 7*a, b*, which slightly limits the travel distance of the slide 19.

FIG. 7, on the other hand, shows an embodiment entirely without preloading springs analogous to FIG. 6.

REFERENCE NUMERALS AND DESIGNATIONS

1 scanning unit
2 position sensor, sensor
3 housing
4 hollow profile, profile
5*a, b* cover plate
6 actuation pushrod
6' actuation pushrod
6*a* scanning head
7*a, b* face plate
8 spring
9 support bushing
10 longitudinal direction, longitudinal extension
11 transversal direction
12 encoder magnet
13 threaded connection
14*a, b* threaded groove
15*a, b* cover bolt
16 fixation device
17 plug socket
18 fixation ear
19 slide
20 outer groove
21*a, b* support bushing
22 ball joint

The invention claimed is:

1. A magneto-strictive scanning unit (1), said unit comprising:
   a magneto-strictive position sensor (2);
   a housing (3) tightly enclosing the position sensor (2) configured as a hollow profile (4) with face cover plates (5a, b); and
   at least one actuation pushrod (6) with at least one scanning head (6a) supported longitudinally movable in the scanning unit (1) in parallel to a longitudinal extension (10) of the position sensor (2) outside of housing (3), and on which actuation pushrod is positioned an encoder magnet (12) for the position sensor (2) and is fixed longitudinally, wherein said at least one actuation pushrod (6) is preloaded into a start position through a spring (8).

2. The scanning unit according to claim 1, wherein said at least one actuation pushrod (6) protrudes in longitudinal direction (10) in both directions over a length of said housing (3) and includes a respective scanning head (6a, b) at both free ends.

3. The scanning unit according to claim 1, wherein two actuation pushrods (6) are provided, which respectively protrude in one of two directions in longitudinal direction (10) beyond a length of said housing with forward ends supporting said at least one scanning head (6a or b), and which are longitudinally fixed directly or indirectly to one another at the rear ends.

4. The scanning unit according to claim 1, wherein said at least one actuation pushrods (6) are guided, on one side, in one respective face plate (7a, b) and mounted at a slide (19) with their rear ends, which slide is supported form-locked in longitudinal direction (10) at said housing (3) and runs in an outer groove (20) of said housing (3).

5. The scanning unit according to claim 1, wherein the at least one actuation pushrod (6) has a circular cross section and is rotatable, and said encoder magnet (12) is an annular magnet.

6. The scanning unit according to claim 1, wherein said encoder magnet (12) is disposed at or in a slide (19).

7. The scanning unit according to claim 1, wherein said at least one actuation pushrod(s) (6) is mounted at a slide (19) through a ball joint (22).

8. The scanning unit according to claim 1, wherein said spring (8) is a helical compression spring, having windings that are concentrically disposed about said at least one actuation pushrod (6).

9. The scanning unit according to claim 1, wherein a spring (8) is supported on one side at one of face plates (7a, b) and on the other side at a respective shoulder of said at least one actuation pushrod (6).

10. The scanning unit according to claim 1, wherein a spring (8) is disposed pointing outward from one of face plates (7a, b).

11. The scanning unit according to claim 1, wherein a spring (8) is disposed in an intermediary space between face plates (7a, b) oriented from one of the face plates (7a, b) to the other face plate (7a, b).

12. The scanning unit according to claim 1, wherein two springs (8a, b) are provided, which are supported at one respective face plate (7a, b) and which support said at least one actuation pushrod(s) (6) in unloaded condition in a defined center position.

13. The scanning unit according to claim 1, wherein a fixation device (16) secures said at least one actuation pushrod (6) of said scanning unit (1) in a retracted position.

14. The scanning unit according to claim 1, wherein said at least one actuation pushrod (6) is supported in a sliding guide in the face plates (7a, b), in particular in support bushings (9) made of plastic or bronze.

15. The scanning unit according to claim 1, wherein said housing (3) includes a circumferentially closed polygonal cross section.

16. The scanning unit according to claim 1, wherein a threaded connection (13) of said face cover plates (5a, b) of said housing (3) in said hollow profile (4) is provided in threaded openings in corners of the profile (4).

17. The scanning unit according to claim 16, wherein said threaded openings are outward open threaded grooves (14a, b) of the profile (4) for threading in self-tapping cover bolts (15a, b).

18. The scanning unit according to claim 1, wherein
   a portion of cover bolts (15a, b) exclusively affix the cover plate (5a, b) at said housing profile; and
   the other portion of the cover bolts (15a, b) extends through face plates (7a, b) of said scanning unit supporting said scanning unit at outer surfaces of said cover plates (5a, b).

19. The scanning unit according to claim 1, wherein face plates (7a, b) radially extend in at least one direction beyond said cover plates (5a, b).

* * * * *